M. L. PARRETT.
HARVESTER-THRASHERS.

No. 184,262. Patented Nov. 14, 1876.

Witnesses,
C. A. Johnson
C. Brannen

Inventor, Milton L. Parrett,
By Thomas G. Orwig, Atty.

UNITED STATES PATENT OFFICE.

MILTON L. PARRETT, OF MARSHALLTOWN, IOWA.

IMPROVEMENT IN HARVESTER-THRASHERS.

Specification forming part of Letters Patent No. 184,262, dated November 14, 1876; application filed December 24, 1875.

*To all whom it may concern:*

Be it known that I, MILTON L. PARRETT, of Marshalltown, in the county of Marshall and State of Iowa, have invented an Improved Harvesting-Machine, of which the following is a specification:

The object of my invention is to facilitate and economize in the gathering of crops of small grain in the field by cutting, thrashing, cleaning, and sacking it by one machine as it advances over the ground. It consists in forming, arranging, and combining a traveling grain-platform, a thrasher, an elevator, a separator, and a conveyer and sacking device with a truck and cutting mechanism, as hereinafter fully set forth.

Figure 1:
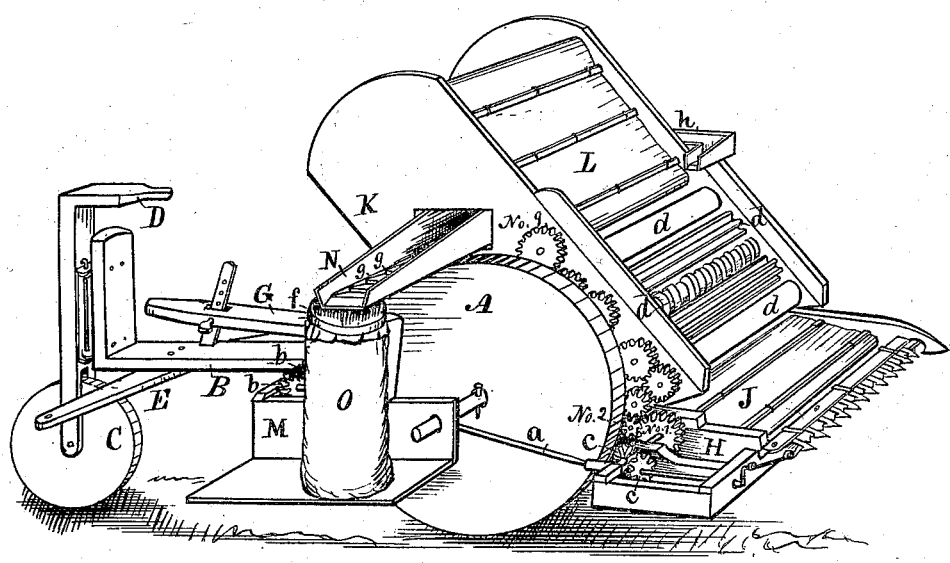

Figure 1 of my drawing is a perspective view, illustrating the construction and operation of my invention.

A represents one of the truck or carriage wheels. It is transformed into a driving-wheel by forming on or attaching thereto on its inside face a crown-wheel. B represents the rear extension of the truck-frame. It is formed and rigidly connected with the axle of the wheel A in any suitable manner. C is a caster-wheel carried by the steering device D, hinged to the rear end of the extension B in any suitable way. E represents a bar fixed at right angles to the extension B, as a means of applying horse-power to move and operate the complete machine. G represents a lever, connected with the adjustable frame that carries the sickle or cutting mechanism. a is the shaft, through and by which power is communicated from the driving-wheel A to the sickle, thrasher, separator, and conveyer and sacker. b b represent gear-wheels, connecting the rear end of the shaft a with the crown-wheel A. A crank at the front end of the shaft a connects the shaft with the sickle-bar. c c are bevel-gear wheels, connecting the shaft a with the gear-wheel No. 1, which is fixed rigidly on the end of the rotating cylinder or shaft that carries the traveling grain-platform. H represents the adjustable frame which carries the sickle. It is formed and connected with the truck-frame of the machine in any suitable manner, so that it can be readily raised and lowered by adjusting the lever G, which is attached at its rear end. J is an endless apron, having cleats attached and mounted in the frame H, to form my traveling grain-platform, which carries the grain as it falls from the sickle rearward and upward, and delivers it to the thrasher. d d d are rollers representing my thrasher. These rollers may have a plain, corrugated, or beaded surface, as desired. A double series is used and elastic bearings are provided, so they will automatically adjust themselves to admit and pass the different kinds and quantities of grain delivered thereto by the carrier and traveling platform J.

5 6 7 8 represent a series of gear-wheels rigidly fixed to the thrashing-rollers d, and connected with the wheel No. 1. K K are the sides of the separator-frame. They are rigidly fixed on the truck-frame of the machine, and incline rearward at an angle of about forty-five degrees. L is an endless apron, carrying the straw upward and rearward from the thrasher. It is mounted and operated on rollers which have their bearings in the sides K. It is connected with the thrasher gear-wheels by the gear-wheel No. 9. A second endless carrier, running parallel with the carrier L underneath it, and extending down to the traveling platform J, is operated by the gear-wheel No. 2, to carry the thrashed grain over an inclined plane to the separator. M is a sack-holding platform, rigidly attached to the side of the machine-frame, and outside of the driving-wheel A. f is a rim, carried by a hinged arm, to clamp the open top of the sack to a fixed ring. N is a grain-conveyer of trough form, and has a series of steps and inclines, g, in its bottom. It is connected with the vibrating screens of the separator, and carries the cleaned grain into the open sack O.

When my machine is operated on the side of a hill, and the conveyer N inclines upward, the series of inclines g in its bottom will prevent the grain from sliding backward.

Figure 2:
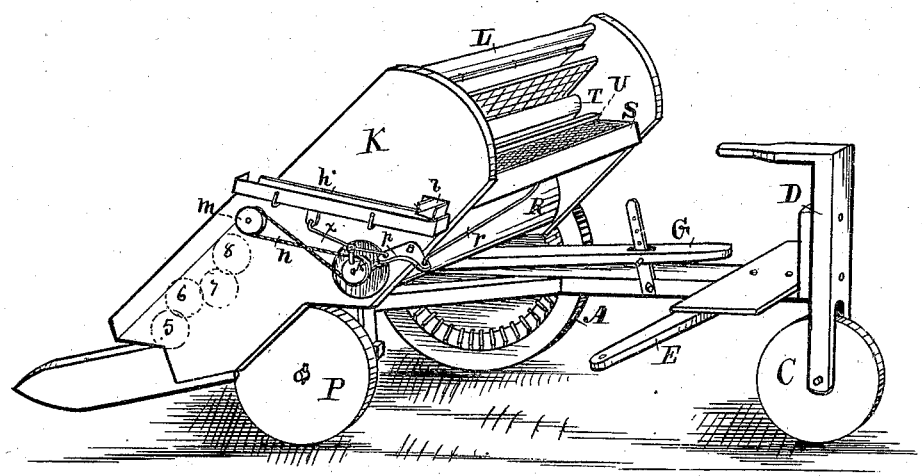

Fig. 2 is a perspective view, showing the opposite side of the machine as illustrated by Fig. 1.

P is a traveling wheel, aiding wheel A to support and carry the complete machine. R is the case inclosing the fan of the separator. h h is a conveyer, designed to carry unthrashed heads of grain forward to the thrasher again. 5 6 7 8 are gear-wheels on the ends of the thrasher-rollers d. k is a pulley on the end of the fan-shaft. m is a pulley on the end of the straw-carrier shaft, opposite the gear-wheel No. 9 on the other end of the same shaft. n is a belt connecting pulleys k and m, to actuate the fan in its case R. S is a sieve, that receives the thrashed grain as it falls from the elevator T, which is operated by means of the gear-wheel No. 2. (Shown in Fig. 1.) U is the inclined plane upon which the thrashed grain is moved and elevated by the elevator T. p is a bell-crank, which has its bearing attached to the side K. It is connected with the conveyer N (shown in Fig. 1) and the sieve or series of sieves S by a pitman, r, on the one side, and connected with a crank on the pulley k on the fan-shaft. Its function is to vibrate the sieves and the transverse conveyers. v is a transverse conveyer, designed to catch the unthrashed grain and deliver it into the longitudinal conveyer h, which carries it forward to the thrasher again. x is a pitman, connecting the conveyer h with a crank on the pulley k, and imparts a reciprocating vibratory motion to the conveyer h.

It is obvious from my description of the construction and operation of my invention that the various parts—sickle, thrasher, separator, conveyers, and sacker—act simultaneously, but in successive order, in taking the grain from the ground and putting it in the sack.

I claim as my invention—

1. In a harvesting-machine, the adjustable frame H G, carrying a sickle and the traveling grain-platform J, in combination with the double series of thrashing-rollers d d d, substantially as and for the purposes shown and described.

2. The adjustable frame H G, carrying the traveling grain-platform J, in combination with the thrashing-rollers d, elevators L and T, and the fixed inclined plane U, substantially as and for the purposes shown and described.

3. The adjustable frame H G, mounted on a carriage, A B C D, and carrying the sickle and the grain-platform J, the frame or sides K K, carrying the thrasher d d d, elevators L and T U, fan and case R, sieves S, and the conveyers N h v, when arranged and combined substantially as shown and described, to cut, thrash, clean, and convey grain from the ground to a sack or other suitable receptacle.

MILTON L. PARRETT.

Witnesses:
  WARREN B. PARRETT,
  A. F. HARADON.